(12) United States Patent
Krais et al.

(10) Patent No.: US 11,545,863 B2
(45) Date of Patent: Jan. 3, 2023

(54) GUIDE DEVICE FOR A COOLING FLUID FLOWING AROUND WINDING HEADS OF AN ELECTRICAL MACHINE, AND ELECTRICAL MACHINE

(71) Applicant: VALEO SIEMENS EAUTOMOTIVE GERMANY GMBH, Erlangen (DE)

(72) Inventors: Nils Krais, Strahlungen (DE); Philipp Söntgerath, Niederkrüchten (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 189 days.

(21) Appl. No.: 16/804,910

(22) Filed: Feb. 28, 2020

(65) Prior Publication Data

US 2020/0366147 A1    Nov. 19, 2020

(30) Foreign Application Priority Data

May 17, 2019   (DE) .................... 10 2019 113 091.3

(51) Int. Cl.
*H02K 3/24*     (2006.01)
*H02K 9/193*    (2006.01)
*H02K 5/20*     (2006.01)

(52) U.S. Cl.
CPC .............. *H02K 3/24* (2013.01); *H02K 5/203* (2021.01); *H02K 9/193* (2013.01)

(58) Field of Classification Search
CPC .. H02K 9/19; H02K 5/20; H02K 3/24; H02K 9/193; H02K 5/203; H02K 5/207
See application file for complete search history.

(56) References Cited

U.S. PATENT DOCUMENTS

| | | | |
|---|---|---|---|
| 2005/0093385 A1* | 5/2005 | Kuhn ................... | F16C 37/007 310/90 |
| 2013/0300232 A1* | 11/2013 | Jung ................... | H02K 15/0087 310/71 |
| 2014/0070639 A1* | 3/2014 | Tamura .................... | H02K 9/19 310/54 |
| 2016/0105067 A1* | 4/2016 | Bradfield ................ | H02K 5/22 310/59 |
| 2017/0310189 A1* | 10/2017 | Hanumalagutti ...... | B60K 6/445 |
| 2020/0112224 A1* | 4/2020 | Okubo ..................... | H02K 9/06 |

FOREIGN PATENT DOCUMENTS

| | | |
|---|---|---|
| DE | 10 2017 211 135 A1 | 1/2019 |
| EP | 2 461 463 A1 | 6/2012 |
| JP | 2010130794 A  * | 6/2010 |
| JP | 4857327 B2 | 1/2012 |
| WO | WO-2018179269 A1 * | 10/2018  ............. H02K 5/161 |

OTHER PUBLICATIONS

Yamaguchi (JP 2010130794 A) English Translation (Year: 2010).*

* cited by examiner

*Primary Examiner* — Tulsidas C Patel
*Assistant Examiner* — Robert E Mates
(74) *Attorney, Agent, or Firm* — Manabu Kanesaka

(57) ABSTRACT

A guide device (1) for a cooling fluid flowing around winding heads (28) of an electrical machine (21), including a body (2), with a recess (4) delimited by an inner edge (3) for guiding through a shaft of the electrical machine (21), and a guide element (5), which protrudes from the body (2) in the axial direction and extends in the peripheral direction in a radial position lying between the inner edge (3) and an outer edge (6) of the body (2).

13 Claims, 3 Drawing Sheets

Figure 1:
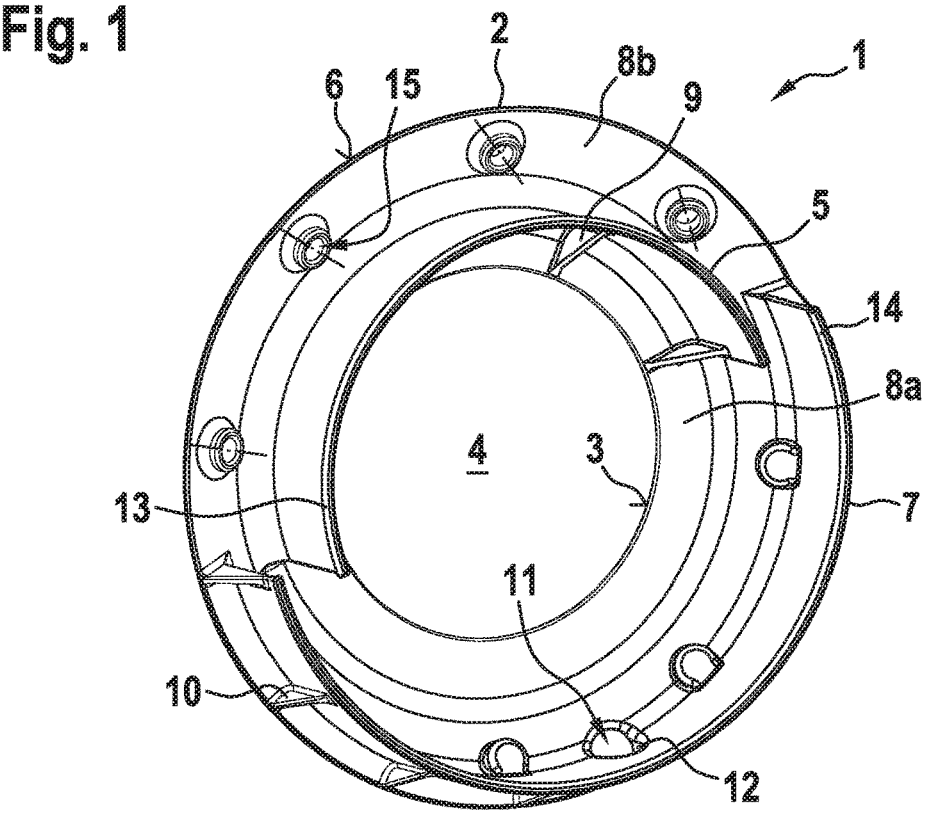

GUIDE DEVICE FOR A COOLING FLUID FLOWING AROUND WINDING HEADS OF AN ELECTRICAL MACHINE, AND ELECTRICAL MACHINE

RELATED APPLICATIONS

The present application is based on, and claims priority from, German Application No. DE 10 2019 113 091.3 filed May 17, 2019, the disclosure of which is hereby incorporated by reference herein in its entirety.

The invention relates to a guide device for a cooling fluid flowing around winding heads of an electrical machine. The invention also relates to an electrical machine.

When electrical machines are operated, stator windings heat up due to their ohmic resistance. The higher a current that is introduced into an electrical machine, the greater are the losses that are caused by the heating. It is known in general to cool the stator windings by means of a cooling fluid. It has already been proposed in this regard to apply the cooling fluid in the form of a jet to winding heads for the purpose of cooling.

Document DE 10 2017 211 135 A1 discloses an electrical machine having a housing in which a stator having a plurality of winding heads is arranged. The housing has a cooling channel through which a cooling medium may flow. The cooling channel has a circular or circle-segment-shaped annular channel portion, via which the cooling medium is feedable through a plurality of openings to part of the winding heads by spraying. A winding head arranged at the bottom is covered by the cooling medium, which collects in an oil sump.

As the winding heads are sprayed, however, the cooling fluid passes, in the case of an electric machine of this kind, to the shaft of the machine and is distributed within the electrical machine as a result of the rotation of the electrical machine. In so doing, the cooling fluid may pass into an air gap between a rotor and a stator of the electrical machine and may cause undesirable drag torques.

The object of the invention consequently is to provide a possibility for the improved distribution of a cooling fluid in an electrical machine.

This object is achieved in accordance with the invention by a guide device for a cooling fluid flowing around winding heads of an electrical machine, said guide device comprising a body with a recess, which is delimited by an inner edge, for guiding through a shaft of electrical machine, and a guide element, which protrudes away from the body in an axial direction and extends in the peripheral direction in a radial position lying between the inner edge and an outer edge of the body.

The invention is based on the notion of guiding the cooling fluid in the peripheral direction around the shaft and in particular also around an air gap between a stator and a rotor of the electrical machine by means of the guide element so that an undesirable distribution of the cooling fluid by the rotating shaft and infiltration into the air gap is hampered or entirely suppressed. The distribution of the cooling fluid in the electrical machine is thus improved; undesirable drag torques during operation of the electrical machine may be reduced or avoided entirely.

The cooling fluid is typically a cooling liquid, in particular a cooling oil.

In the case of the guide device according to the invention, it is preferred if this also comprises a second guide element which protrudes away from the body in the axial direction and extends in the peripheral direction in a second radial direction lying between the first radial position and the outer edge of the body. The second guide element is used to receive the cooling fluid flowing in the direction of a machine bottom as a result of the force of gravity, once said cooling flow has passed down from the first guide element, and allows the cooling fluid to flow selectively around lower winding heads of the stator winding for cooling.

In this regard it is preferred if the centres of the guide elements, in the peripheral direction, are arranged so as to be connectable by a line traversing the centre point of the recess.

It is also advantageous if, in the region of the centre, an outlet opening for the cooling fluid is formed in the peripheral direction of the second guide element. The cooling fluid may thus be discharged effectively once it has reached the lowest point of the second guide element. It is preferably provided here that the second guide element has a radial indentation which opens into the outlet opening formed in the body.

In accordance with an advantageous embodiment of the guide device according to the invention it is provided that a radially outwardly pointing elevation is formed at the free end of the first guide element and/or a radially inwardly pointing elevation is formed at the free end of the second guide element. The elevation provides the corresponding guide element with a trough-like structure, which, in the case of the second guide element, hampers or prevents an axial escape of the cooling fluid from the guide device, and in the case of the first guide element hampers or prevents such an escape of the cooling fluid to an even greater extent, and in particular enables a selective guidance of the cooling fluid to the outlet opening.

Generally, it is preferred if the first guide element and the second guide element form one or two overlap regions(s) extending in the peripheral direction.

The first guide element preferably extends over at least 150 degrees, preferably at least 170 degrees, particularly preferably at least 175 degrees, and/or at most 200 degrees, preferably at most 185 degrees, particularly preferably at most 180 degrees, in the peripheral direction. The second guide element may also extend over at least 150 degrees, preferably at least 170 degrees, particularly preferably at least 175 degrees, and/or at most 210 degrees, preferably at most 200 degrees, particularly preferably at most 185 degrees, in the peripheral direction.

Alternatively, it may be provided that the first guide element and/or the second guide element extends fully around the recess in the peripheral direction.

The guide device according to the invention is particularly preferably formed from a plastics material.

The object forming the basis of the invention is also achieved by an electrical machine comprising a stator with stator windings and a guide device according to the invention arranged on an end face, wherein the first guide element is arranged inside of the winding heads of the stator windings in the radial direction. A further guide device according to the invention is expediently arranged on the other end face.

It may be provided that the second guide element is arranged outside of the winding heads in the radial direction.

In order to effectively hamper or prevent an infiltration of the cooling fluid into the air gap, it is expedient if the electrical machine according to the invention also comprises a rotor arranged inside the stator so as to form an air gap, wherein a radially outermost portion is positioned on the free end of the first guide element radially further outwardly as compared to the air gap.

A coolant feed is also preferably provided in the electrical machine according to the invention and is arranged in such a way that the cooling fluid is conducted to the first guide element in order to flow around the first guide element in a peripheral direction. It is particularly preferred if the coolant feed is arranged in such a way that the cooling fluid is conducted in a radial direction to the first guide element. The coolant feed may have a plurality of feed openings, in particular distributed in the peripheral direction.

The guide device is preferably secured to an end plate of the electrical machine. The guide device may thus be easily retrofitted in existing machine architectures.

Alternatively, however, it is also conceivable for the guide device to be formed integrally with an end plate of the electrical machine. In order to provide an electrical insulation of the guide device, the end plate may be powder-coated, for example.

The stator windings are particularly preferably formed as hairpin windings.

All embodiments of the guide device according to the invention may be transferred to the electrical machine according to the invention, and therefore the aforementioned advantages may be attained also with the electrical machine.

Figure 2:
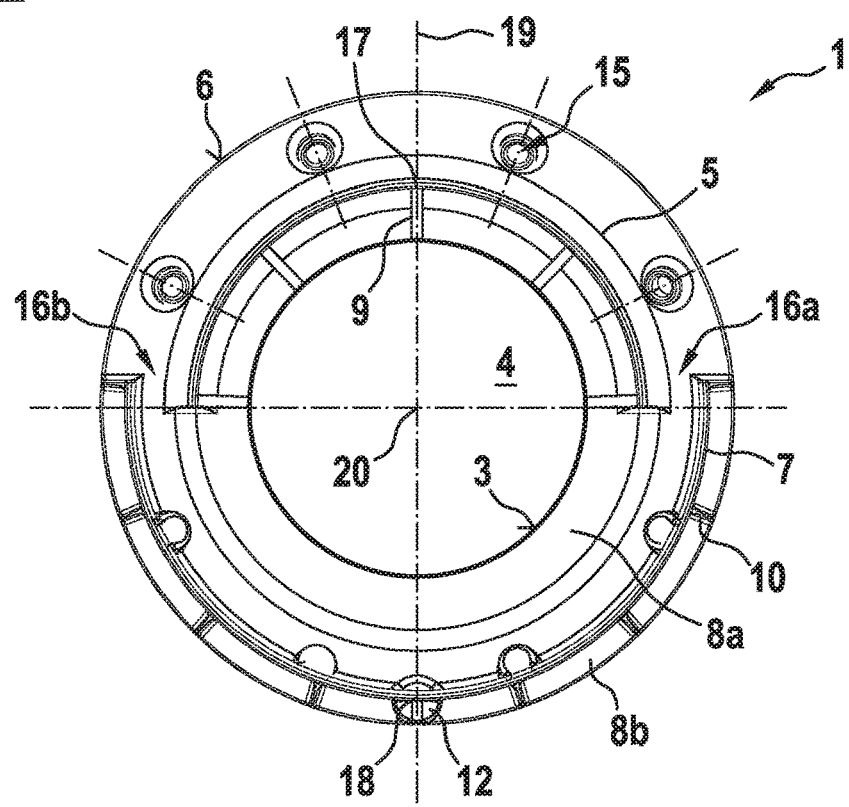
Figure 3:
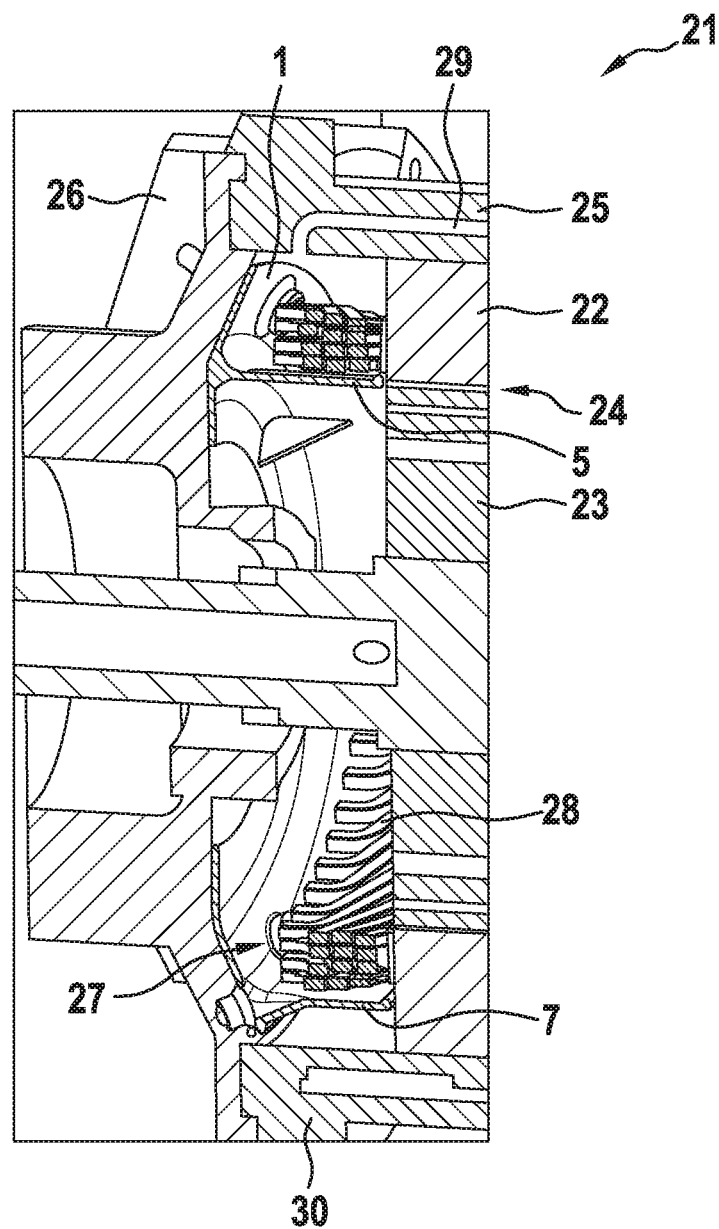
Figure 4:
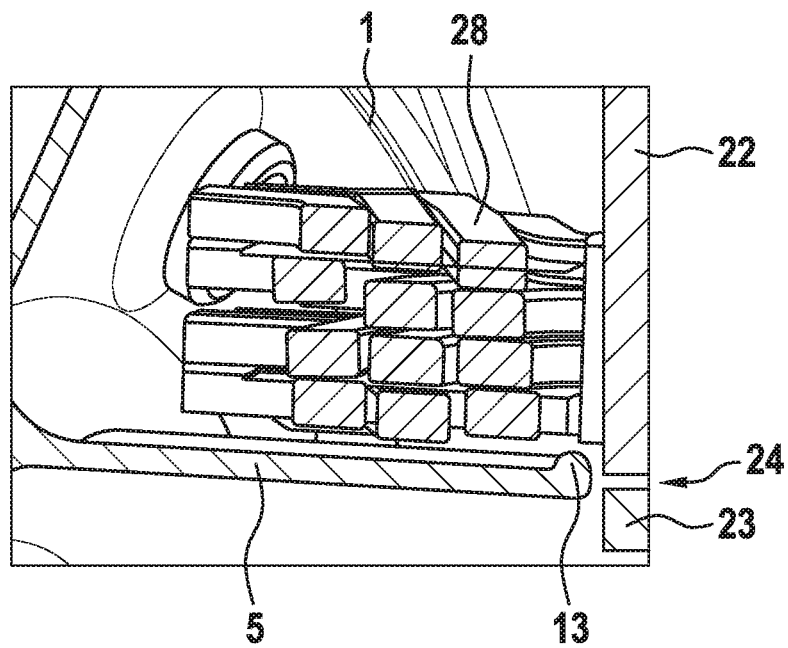
Figure 5:
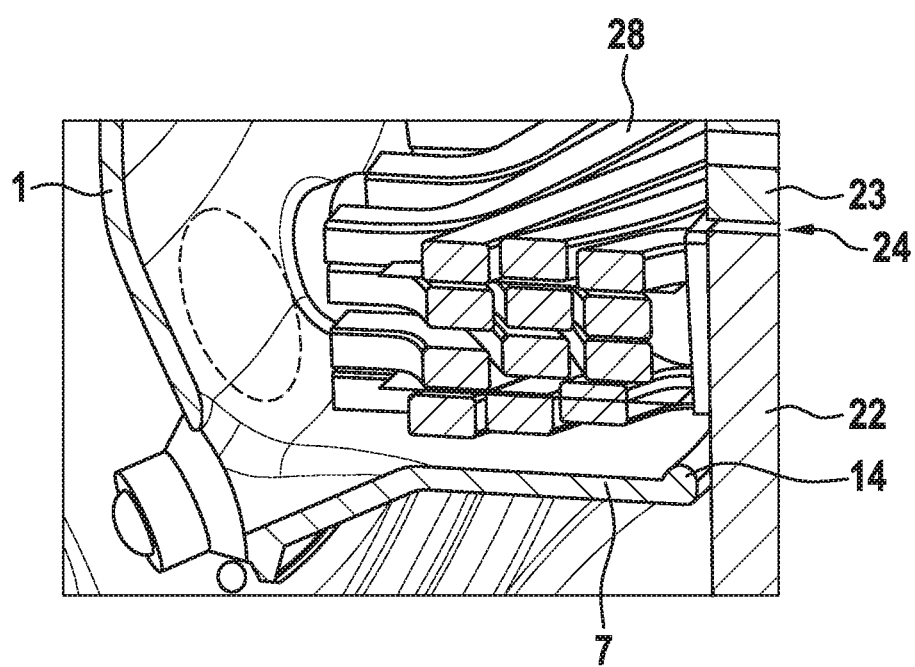

Further advantages and details of the present invention will become clear from the exemplary embodiments described hereinafter and also with reference to the drawings. These are schematic representations and show:

FIG. 1 a perspective view of an exemplary embodiment of the guide device according to the invention;

FIG. 2 an axial plan view of the guide device shown in FIG. 1;

FIG. 3 a perspective sectional illustration of an exemplary embodiment of the electrical machine according to the invention;

FIG. 4 a perspective detailed view of the electrical machine in the region of a first guide element of the guide device; and FIG. 5 a perspective detailed view of the electrical machine in the region of a second guide element of the guide device.

FIG. 1 is a perspective view of an exemplary embodiment of a guide device 1.

The guide device comprises a body 2, with a recess 4 delimited by an inner edge 3, and also a first guide element 5, which protrudes from the body in the axial direction and extends in the peripheral direction in a first radial position lying between the inner edge 3 and an outer edge 6 of the body 2. The guide device 1 additionally also comprises a second guide element 7, which protrudes from the body 2 in the axial direction and extends in the peripheral direction in a second radial position lying between the first radial position and the outer edge 6. The entire body 2 is formed from an electrically insulating material, in this particular case from a plastics material.

The body 2 to this end has an inner portion 8a, which is delimited by the edge 3 and which extends along a radial plane, and a second portion 8b, which is delimited by the outer edge 6 and is axially angled relative to the first portion 8a. On a first side of the body 2 visible in FIG. 1, the first guide element 5 is arranged in a transition region between the first portion 8a and the second portion 8b and is secured to the first portion 8a by means of additional radially inwardly pointing reinforcement elements 9. The second guide element 7 protrudes axially from the second portion 8b of the body and is reinforced by additional radially outwardly pointing reinforcement elements 10.

An outlet opening 11 is formed in the body 2 in the region of the middle of the second guide element. The outlet opening 11 passes through the second portion 8b of the body 2. In addition, a radially outwardly pointing indentation 12 is formed in the second guide element 7 and opens into the outlet opening 11.

At a free end of the first guide element 5 there is formed a radially outwardly pointing elevation 13, which will be explained later in greater detail with reference to FIG. 4. At a free end of the second guide element 7 there is formed a radially inwardly pointing elevation 14, which will be explained later in greater detail with reference to FIG. 5.

In addition, the body 2 has a plurality of through-openings 15 formed in the peripheral direction in its second portion 8b, which are usable in order to secure the guide device 1 in position or to introduce a cooling fluid to the first guide element.

FIG. 2 is an axial plan view of the side of the guide device 1 shown in FIG. 1.

The first guide element 5 extends in the peripheral direction over an angular range of 180°. By contrast, the second guide element 7 extends over an angular range of approximately 195°, such that the guide elements 5, 7 form two overlap regions 16a, 16b. The centres 17, 18 of the guide elements 5, 7 are arranged such that a line 19 connecting them traverses the centre point 20 of the recess 4.

FIG. 3 is a perspective sectional illustration of an exemplary embodiment of an electrical machine 21 in the region of a first end face.

The electrical machine 21 comprises a stator 22 and a rotor 23, between which there is formed an air gap 24, and also a machine housing 25, and an end plate 26. In FIG. 3 an A end plate is shown. The electrical machine 21 has, on its second end face, a further end plate (B end plate). A guide device 1 according to the previously described exemplary embodiment is arranged on each of these end plates 26. The electrical machine 21 is a prime mover for an electrically drivable vehicle.

The stator 22 has stator windings 27, which are formed as hairpin windings. Winding heads 28 of the stator windings 27 protrude from the stator 22 in the direction of the end plate 26. The first guide element 5 is arranged radially inside of the winding heads 28, and the second guide element 7 is arranged radially outside of the winding heads 28.

The electrical machine 21 also has a coolant feed 29, which is arranged in such a way that a cooling fluid is conducted to the first guide element 5 in order to flow around the first guide element in the peripheral direction. In the overlap regions 16a, 16b (see FIG. 2), the cooling fluid flows down from the first guide element 5 to the second guide element 7 as a result of the force of gravity acting in the direction of a machine bottom 30. From there, the cooling fluid flows around the other winding heads 28 and passes at the lowest point of the second element 7 into the outlet opening 11 (see FIG. 1).

FIG. 4 is a perspective detailed view of the electrical machine 21 in the region of the first guide element 5. As can be seen, a radially outermost portion of the first guide element 5 lies radially further outwardly than the air gap 24. The elevation 13 prevents cooling fluid from escaping axially from the guide device 1 and entering the air gap 24.

FIG. 5 is a perspective detailed view of the electrical machine 21 in the region of the second guide element 7. Here, the elevation 14 prevents cooling fluid from escaping axially from the guide device 1 and from leaving the guide device 1 other than through the outlet opening 11 (see FIG. 1).

The invention claimed is:

1. An electrical machine, comprising:
   a stator having stator windings, and
   a guide device for a cooling fluid flowing around winding heads of the electrical machine, the guide device being secured to an end plate of the electrical machine, and comprising:
   a body, with a recess delimited by an inner edge for guiding through a shaft of the electrical machine, and
   a first guide element, which protrudes from the body in an axial direction and extends in a peripheral direction in a first radial position lying between the inner edge and an outer edge of the body, the first guide element being arranged inside of the winding heads of the stator windings in a radial direction, and
   a second guide element formed separately from the first guide element, the second guide element protruding from the body in the axial direction and extending in the peripheral direction in a second radial position lying between the first radial position and the outer edge of the body, the second guide element being arranged outside of the winding heads in the radial direction,
   wherein the first guide element and the second guide element form two overlap regions extending in the peripheral direction.

2. The electrical machine according to claim 1, wherein centers in the peripheral direction of the guide elements are arranged so as to be connectable by a line traversing a center point of the recess.

3. The electrical machine according to claim 2, wherein an outlet opening for the cooling fluid is formed in a region of the center in the peripheral direction of the second guide element.

4. The electrical machine according to claim 3, wherein the second guide element has a radial indentation, which opens into the outlet opening formed in the second guide element.

5. The electrical machine according to claim 1, wherein a radially outwardly pointing elevation is formed at a free end of the first guide element and/or a radially inwardly pointing elevation is formed at a free end of the second guide element.

6. The electrical machine according to claim 1, wherein the guide device is formed from a plastics material.

7. The electrical machine according to claim 1, further comprising a rotor arranged inside the stator so as to form an air gap, wherein a radially outermost portion is positioned at a free end of the first guide element radially further outwardly than the air gap.

8. The electrical machine according to claim 1, further comprising a coolant feed, which is arranged in such a way that the cooling fluid is conducted to the first guide element in order to flow around the first guide element in the peripheral direction.

9. The electrical machine according to claim 1, wherein the stator windings are formed as hairpin windings.

10. The electrical machine according to claim 1, wherein an outlet opening is formed at a bottom inside the second guide element so that the cooling fluid flows around the first guide element enters an inside of the second guide element through gaps, and exits from the outlet opening.

11. The electrical machine according to claim 1, wherein the first guide element extends substantially half of the recess, and the second guide element extends substantially another half of the recess to form the two overlap regions extending in the peripheral direction.

12. The electrical machine according to claim 1, wherein the body has a flat plate shape having an inner portion with the recess therein, and an outer portion inclined with respect to the inner portion, the first guide element being located between the inner portion and the outer portion, the second guide element being located in the outer portion.

13. The electrical machine according to claim 12, wherein the first guide element is secured between the inner portion and the outer portion by radially inwardly pointing reinforcement elements, and the second guide element is secured to the outer portion by radially outwardly pointing reinforcement elements.

* * * * *